Patented Jan. 23, 1951

2,538,960

UNITED STATES PATENT OFFICE 2,538,960

6-CYCLOPROPYL-2-THIOURACIL AND METHOD OF PREPARING SAME

Jack Bernstein, New Brunswick, N. J., assignor to E. R. Squibb & Sons, New York, N. Y., a corporation of New York No Drawing. Application October 11, 1946, Serial No. 702,571

4 Claims. (Cl. 260—260)

This invention relates to thiouracils.
Thiouracil, a compound of the formula

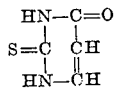

has been found to be an effective agent in controlling the major manifestations of hyperthyroidism. Recently [cf. J. Am. Chem. Soc. 67, 2197 (1945)], a series of substituted 2-thiouracils have been prepared, some of which have much higher antithyroid activity than thiouracil (e. g. the 6-n-propyl), others having about the same activity (e. g. the 6-cyclohexyl), and still others having considerably less or substantially no antithyroid activity (e. g. the 5,6-trimethylene). The reason for the differences in activity resulting on introduction of the various substituents is not known. Although thiouracil and the various substituted 2-thiouracils prepared prior to this invention have given rise to toxic reactions and other complications in use, the incidence of these is less than with other methods of treatment.

It is the object of this invention to provide a superior agent for the treatment of hyperthyroidism, and a method of preparing it.

The agent of this invention is 6-cyclopropyl-2-thiouracil. This compound is obtained by reacting methyl cyclopropyl ketone with a di (lower-alkyl) carbonate (especially diethyl carbonate) to obtain a lower alkyl (especially ethyl) β-keto-β-cyclopropyl-propionate, and condensing the latter with thiourea. The reaction of the ketone and the carbonate and the condensation of the reaction product with thiourea are effected in the presence of an alkaline condensing agent of the group consisting of alkali-metal amides and alkali metal alcoholates, especially in the presence of sodium ethylate.

The following example is illustrative of the invention: (a) 46 g. sodium is dissolved in 1200 ml. dry absolute alcohol in a 3-liter three-necked flask; the alcohol is removed by distillation; and the residue (sodium ethylate) is dried at 200° C. for two hours under nitrogen at sub-atmospheric pressure. The flask containing the sodium ethylate is then cooled by an ice-water bath, and then returned to atmospheric pressure; and 1400 ml. diethyl carbonate is immediately added to the flask contents. The flask is then fitted with a dropping funnel, vacuum-stirrer and a 12-inch Vigreux column equipped with a condenser for downward distillation; the mixture in the flask is vigorously stirred and heated to 50° C. (by means of a water bath) under a vacuum of 120 mm. Hg, a slurry of sodium ethylate in diethyl carbonate being formed; and 168 g. of methyl cyclopropyl ketone (the commercial compound dried over magnesium sulfate and distilled) is added dropwise over a ten-minute period, while maintaining the vacuum. The temperature of the water bath is then raised to 60–70° C. and maintained there for two hours while stirring the reaction mixture. The distillate (340 ml.) collected during this period consists primarily of the ethanol formed by the reaction. The reaction mixture is then cooled to room temperature; and after standing about 12–16 hours at atmospheric pressure, it is poured into one liter of crushed ice containing 218 ml. concentrated hydrochloric acid. The supernate (an orange-colored organic liquid) is separated from the water layer in a separatory funnel, and the water layer is extracted with two portions of ether. The supernate and ether extracts are combined, washed with two 100 ml. portions of saturated sodium chloride solution, then with a 50 ml. portion of saturated sodium bicarbonate solution, followed by two additional 50 ml. portions of saturated sodium chloride solution. The washed liquid is then dried over anhydrous magnesium sulfate and filtered; and the ether (and excess diethyl carbonate) is removed from the filtrate by distillation. The residue is then distilled under a high vacuum, yielding 197 g. of the product (ethyl β-keto-β-cyclopropylpropionate), boiling at 79–83° C./4 mm. The analysis of the material obtained on redistillation of this product (181 g., boiling at 74–78° C./4 mm.) is in close agreement with that calculated for $C_8H_{12}O_3$.

(b) 48.3 g. sodium is dissolved in 950 ml. absolute alcohol in a 3-liter, three-necked flask fitted with a mercury-seal stirrer, a bulb reflux condenser and calcium chloride tube, and a dropping funnel. Then, while stirring, 80 g. thiourea is added, followed by 164 g. ethyl β-keto-β-cyclopropyl-propionate over a period of five minutes, and the mixture is heated with stirring on a steam bath to provide gentle refluxing for five hours. After standing at room temperature for about 12–16 hours, the reaction mixture is heated to distill off the alcohol, and the dry residue is dissolved in 1100 ml. water and filtered by suction. The filtrate is placed in an ice-water bath, and glacial acetic acid is added while stirring vigorously until the mixture is acid to litmus. The mixture is then stirred for two more hours; and the precipitate which forms is filtered off, washed well with water, and dried on a steam bath. The product (6-cyclopropyl-2-thiouracil) is obtained in a yield of 108 g. and melts at 221–226° C. On recrystallization from a mixture of 1600 ml. water and 700 ml. alcohol, the melting point is raised to 239–240° C. (with slight sintering at 229° C.). On further recrystallization from 4 liters water, 76.6 g. of a product melting at 239–240° C. is obtained, the analysis of which is in close agreement with that calculated for $C_7H_8N_2OS$.

The product, 6-cyclopropyl-2-thiouracil, has been found on clinical trial to be a superior agent for the treatment of hyperthyroidism, having high antithyroid activity, and having substantially no undesired side effects.

The various reagents and solvents employed in the foregoing example may of course be replaced by their recognized equivalents. For example, sodium amide and sodium methylate may be employed in place of the sodium ethylate.

The invention may be variously otherwise embodied within the scope of the appended claims.

I claim:
1. 6-cyclopropyl-2-thiouracil.
2. The method which comprises reacting methyl cyclopropyl ketone with a di (lower alkyl) carbonate and recovering the lower alkyl $\beta$-keto-$\beta$-cyclopropyl-propionate formed.
3. The method which comprises reacting methyl cyclopropyl ketone with diethyl carbonate, and recovering the ethyl $\beta$-keto-$\beta$-cyclopropyl-propionate formed.
4. The method of preparing 6-cyclopropyl-2-thiouracil, which comprises reacting methyl cyclopropyl ketone with diethyl carbonate to obtain ethyl $\beta$-keto-$\beta$-cyclopropyl-propionate, condensing the latter with thiourea, and recovering the 6-cyclopropyl-2-thiouracil formed.

JACK BERNSTEIN.

REFERENCES CITED

The following references are of record in the file of this patent:

Textbook of Organic Chemistry by George Holmes Richter, 1938 edition, Wiley, page 17.

Organic Chemistry, by Fieser and Fieser, 1944 edition, D. C. Heath and Co., Boston, pp. 49–50 and 297.

J. A. C. S., 67, pp. 2197–2200.